United States Patent
D'Aquino et al.

(10) Patent No.: US 7,304,272 B1
(45) Date of Patent: Dec. 4, 2007

(54) SYSTEMS AND METHODS FOR ADJUSTING PARAMETERS OF A TEMPERATURE SENSOR FOR SETTLING TIME REDUCTION

(75) Inventors: Dan D'Aquino, San Diego, CA (US); Mehmet Aslan, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 11/314,066

(22) Filed: Dec. 20, 2005

Related U.S. Application Data (60) Provisional application No. 60/719,819, filed on Sep. 23, 2005.

(51) Int. Cl.
*H05B 1/02* (2006.01)
(52) U.S. Cl. ............ 219/497; 219/499; 219/501; 219/505; 374/101; 374/128
(58) Field of Classification Search ........... 219/492, 219/497, 499, 501, 505, 494; 374/100–104, 374/120–128
See application file for complete search history.

(56) References Cited

U.S. PATENT DOCUMENTS

| | | | | |
|---|---|---|---|---|
| 3,882,728 A | * | 5/1975 | Wittlinger | 374/112 |
| 5,493,533 A | * | 2/1996 | Lambrache | 365/210 |
| 5,557,551 A | * | 9/1996 | Craft | 702/130 |
| 5,592,124 A | * | 1/1997 | Mullins et al. | 330/308 |
| 6,816,351 B1 | * | 11/2004 | Frank et al. | 361/103 |

\* cited by examiner

*Primary Examiner*—Mark Paschall (57) ABSTRACT

A system for adjusting parameters of a temperature sensor for settling time reduction is disclosed. The system includes an input for receiving a signal for triggering an adjustment of one or more parameters associated with one or more portions of the temperature sensor. And, an adjuster that includes a current sourcing/sinking adjuster, a feedback loop current adjuster and a feedback loop resistance adjuster coupled to the input. The adjuster adjusts one or more voltages associated with one or more portions of the temperature sensor in response to a receipt of the signal for triggering an adjustment to achieve the settling time reduction.

20 Claims, 8 Drawing Sheets

SYSTEMS AND METHODS FOR ADJUSTING PARAMETERS OF A TEMPERATURE SENSOR FOR SETTLING TIME REDUCTION

CROSS REFERENCES TO RELATED APPLICATIONS

This application claims priority to provisional patent application, Ser. No. 60/719,819, entitled "Circuit And Method For Increasing The Loop Gain For Improved Settling Time," with filing date Sep. 23, 2005, and assigned to the assignee of the present invention, the disclosure of which is hereby incorporated by reference. This application is related to co-pending patent application, Ser. No. 11/315,511, entitled "Improved Matching For Time Multiplexed Transistors," with filing date Dec. 21, 2005, and assigned to the assignee of the present invention, the disclosure of which is hereby incorporated by reference. This application is also related to co-pending patent application, Ser. No. 11/315,527, entitled "Improved Matching For Time Multiplexed Resistors," with filing date Dec. 21, 2005, and assigned to the assignee of the present invention, the disclosure of which is hereby incorporated by reference.

TECHNICAL FIELD

The present invention relates generally to systems and methods for adjusting parameters of a temperature sensor. In particular, embodiments of the present invention relate to systems and methods for adjusting parameters of a temperature sensor for settling time reduction.

BACKGROUND ART

Temperature is an environmental condition that is often measured to obtain temperature measurements that can be important to the operation of many systems. Most physical, electronic, chemical, mechanical and biological systems and their associated processes are affected by temperature. Some processes only operate adequately within a particular range of temperatures. When these processes need to be optimized, control systems that keep temperature within specified limits can be used to manage temperature. Temperature sensors are devices that provide input measures of the temperature to those control systems.

Many electronic components can be damaged by exposure to excessively high or low temperatures. Semiconductor devices and LCDs are examples of commonly used components that can be damaged by temperature extremes. When temperature limits are exceeded, action must be taken to protect the exposed system. Temperature sensing is an important component of any reliable measure to protect devices from exposure to excessive temperatures.

An example of a system that uses temperature sensors to manage the temperature of its components is a personal computer. It should be appreciated that a personal computer's motherboard and hard disk drive generate a significant amount of heat. An internal fan can be used to help manage the heat that is generated. However, if the internal fan fails, or the flow of air is blocked, permanent damage can result. By sensing the temperature inside the case of the personal computer, high temperature conditions can be detected and actions can be taken to reduce system temperature, or even to shut down the system to avert catastrophe.

Other applications simply require temperature data that can be provided by a sensor so that the effect of temperature on a process can be accounted for. Such applications can include processes where optimum temperatures must be identified, processes where temperature variation needs to be tracked, and processes where knowing a temperature level enables compensation.

Settling time is the time required for nodes of a temperature sensor to settle. The settling time of a temperature sensor is a crucial factor in the measurement of temperatures. For an accurate measurement, the node from which a measurement is taken must settle. If settling time is too long then a measurement of temperature provided by a temperature sensor can take too long to effectively respond to the measured temperature condition (e.g., to prevent damage). Moreover, the faster a measurement can be provided the faster the response to a temperature condition can be made. Many of the conventional temperature sensors that are currently in use include inadequate systems for reducing settling time.

SUMMARY OF THE INVENTION

Accordingly, a need exists for a system and method that reduces the settling time of a temperature sensor. The present invention provides a system and method that accomplishes this need.

One embodiment of the present invention provides a charge current control system. A system for adjusting parameters of a temperature sensor for settling time reduction is disclosed. The system includes an input for receiving a signal for triggering an adjustment of one or more parameters associated with one or more portions of the temperature sensor. And, an adjuster coupled to the input for adjusting one or more parameters associated with one or more portions of the temperature sensor based on the triggering. The aforementioned, one or more parameters of the temperature sensor are adjusted by a selected amount.

One embodiment of the present invention provides a temperature sensor for measuring temperature and providing an output measure of the temperature. The temperature sensor includes a system for adjusting parameters of a temperature sensor for settling time reduction. The system includes an input for receiving a signal for triggering an adjustment of one or more parameters associated with one or more portions of the temperature sensor. And, an adjuster coupled to the input for adjusting one or more parameters associated with one or more portions of the temperature sensor based on the triggering. The aforementioned, one or more parameters of the temperature sensor are adjusted by a selected amount.

Embodiments include the above wherein the adjuster includes a current sinking adjuster for adjusting the current sinking capacity of an op-amp, a feedback loop current adjuster for adjusting the current in a feedback loop of the temperature sensor; and a feedback loop resistance adjuster for adjusting the resistance of the feedback loop of the temperature sensor.

These and other advantages of the present invention will no doubt become obvious to those of ordinary skill in the art after having read the following detailed description of the preferred embodiments, which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, the present invention may be practiced without these specific details. In other instances, well known methods, procedures, components, and circuits have not been described in detail as not to unnecessarily obscure aspects of the present invention.

Overview of Nomenclature

For purposes of the following discussion the term "measurement cycle" is intended to refer to a period of a measurement process wherein respective voltage measurements are taken upon which a single temperature computation is based. The respective voltage measurements correspond to respective current levels and their associated respective transistor and resistor matching scheme phases. The term "measurement phase" is intended to refer to the part of the measurement cycle wherein a single voltage measurement is taken that corresponds to a specific current level and a specific matching phase (for resistors and transistors). The term "matching scheme" is intended to refer to both resistor and transistor matching schemes that assure the deviations in resistances in resistors and deviations in gate-source voltages of transistors are resolved between matching phases such that a constant differential is provided. The term "settling pressure" is intended to refer to the force of an applied voltage (either increased or decreased) to hasten the settling of nodes.

Figure 1A:
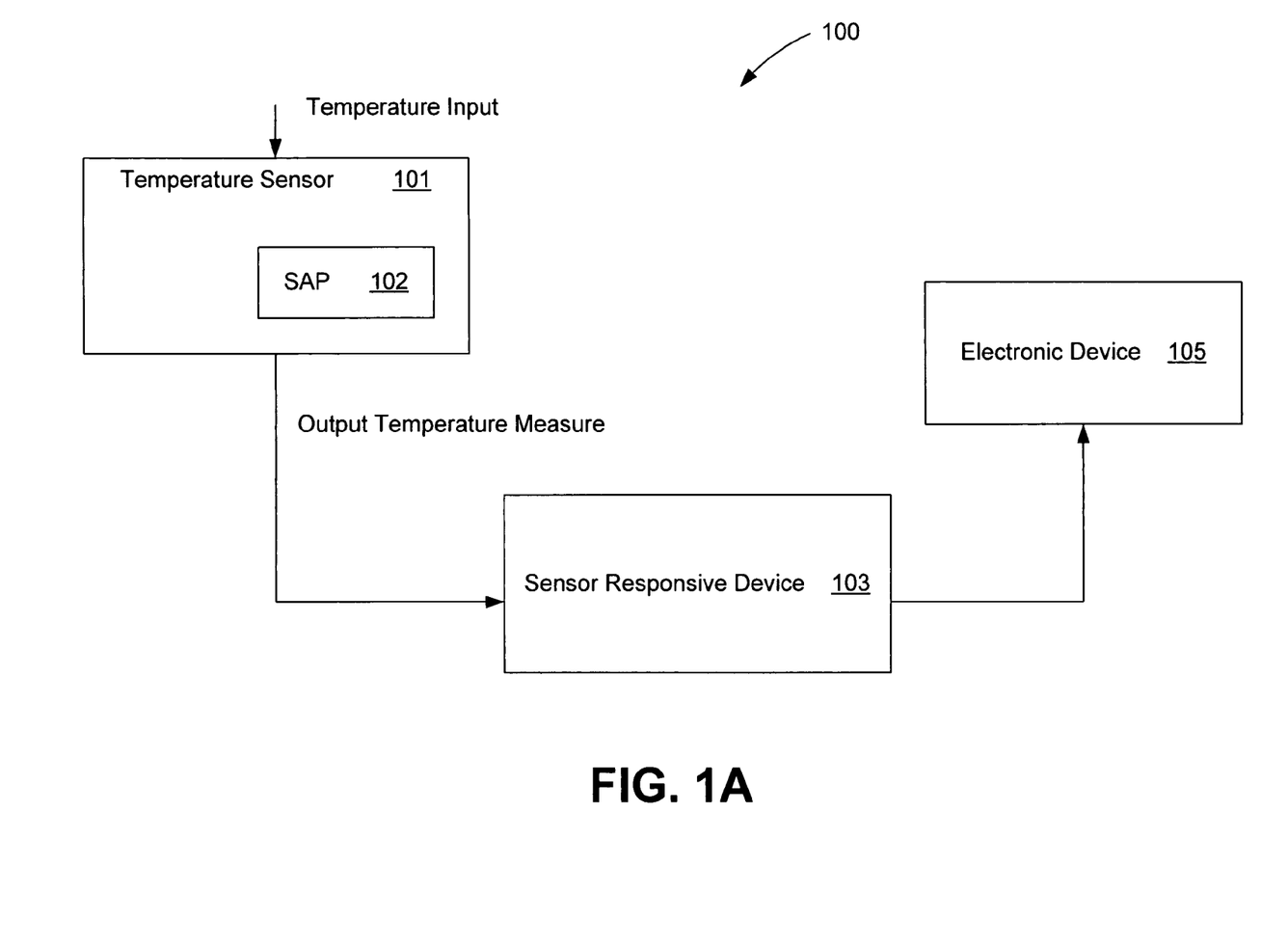
FIG. 1A is a block diagram of components of an electronic system that includes a temperature sensor and associated electronic device according to one embodiment of the present invention.

Exemplary Temperature Sensor Application in Accordance with Embodiments of the Present Invention FIG. 1A is a block diagram of components of an electronic system 100 that includes a temperature sensor and associated electronic device according to one embodiment of the present invention. In one embodiment, the temperature sensor includes a system for adjusting one or more parameters of one or more components of the temperature sensor for hastening temperature sensor settling time. FIG. 1A shows temperature sensor 101, system 102 for adjusting parameters of a temperature sensor, sensor responsive circuit/device 103, electronic device 105.

Referring to FIG. 1A, temperature sensor 101 monitors the temperature of electronic device 105 and upon detecting a predetermined temperature, provides a signal to a sensor responsive circuit/device 103 that responds by taking some action (e.g., shut off or cool electronic device 105). The speedy response of temperature sensor 101 is important. A characteristic that is critical to the speedy response of the temperature sensor 101 is settling time. This is because a reliable measure of temperature can only be provided once critical nodes of temperature sensor 101 settle.

For this reason, settling times that are too long are undesirable and can lead to undesirable results. For example, if electronic device 105 begins to overheat, and temperature sensor 101 takes too long to settle, measurements corresponding to the sensed temperature can be delayed until it is too late to respond effectively to the overheating condition of electronic device 105. Clearly, such a delayed response can be catastrophic in terms of potential damage to electronic device 105.

Referring again to FIG. 1A, as discussed above, temperature sensor 101 includes system 102 for adjusting parameters of temperature sensor 101. In one embodiment, one or more parameters of temperature sensor 101 can be adjusted to improve the settling time of temperature sensor 101. It should be appreciated that parameter adjustments that are discussed herein serve to hasten the settling action of temperature sensor 101, by maintaining a persistent settling pressure on components of temperature sensor 101 as will be described in detail below.

In the FIG. 1A example, the temperature of electronic device 105 is monitored continuously during normal operation. As discussed above, a speedy response to a predetermined temperature reading is highly desirable. In one embodiment, to prevent electronic device 105 from overheating, sensor responsive circuit/device 103 can provide a cutoff signal to, or act to cool, electronic device 105 in response to a signal received from temperature sensor 101. It should be appreciated that electronic device 105 can include but is not limited to a microprocessor, microcontroller, ASIC or other integrated circuit.

Figure 1B:
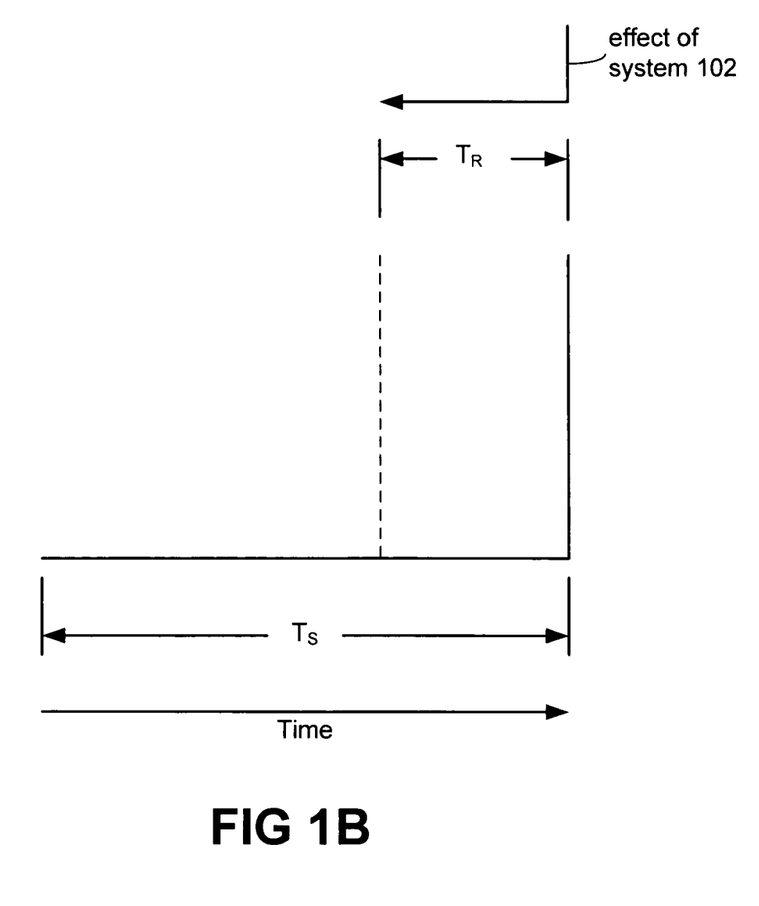
FIG. 1B is a diagram that illustrates the action of system for adjusting parameters of the temperature sensor according to one embodiment of the present invention.

In operation, temperature sensor 101 monitors electronic device 105 for the presence of a predetermined temperature. Upon the detection of predetermined switching conditions system 102 adjusts parameters of temperature sensor 101 so that an appropriate settling pressure is maintained on critical nodes of temperature sensor 101 so that they are prompted to settle quickly. FIG. 1B is a diagram that illustrates the effect of system 102 for adjusting parameters of temperature sensor 101 according to one embodiment of the present invention. Referring to FIG. 1B, system 102 for adjusting parameters of temperature sensor 101 reduces the settling time $T_S$ that temperature sensor 101 would exhibit in the absence of system 102 by a time $T_R$ such that a more accurate indicator of the temperature of electronic device 105 can be provided (since a reading that corresponds to a more immediately sensed temperature can be obtained from temperature sensor 101). In one embodiment, as mentioned above, temperature sensor 101 can provide a signal to sensor responsive circuit/device 103 if the temperature of electronic device 105 has reached a predetermined level. In response to the signal provided by temperature sensor 101, sensor responsive circuit/device 103 can act to protect electronic device 105 by shutting it down, cooling it off, etc.

Figure 2:
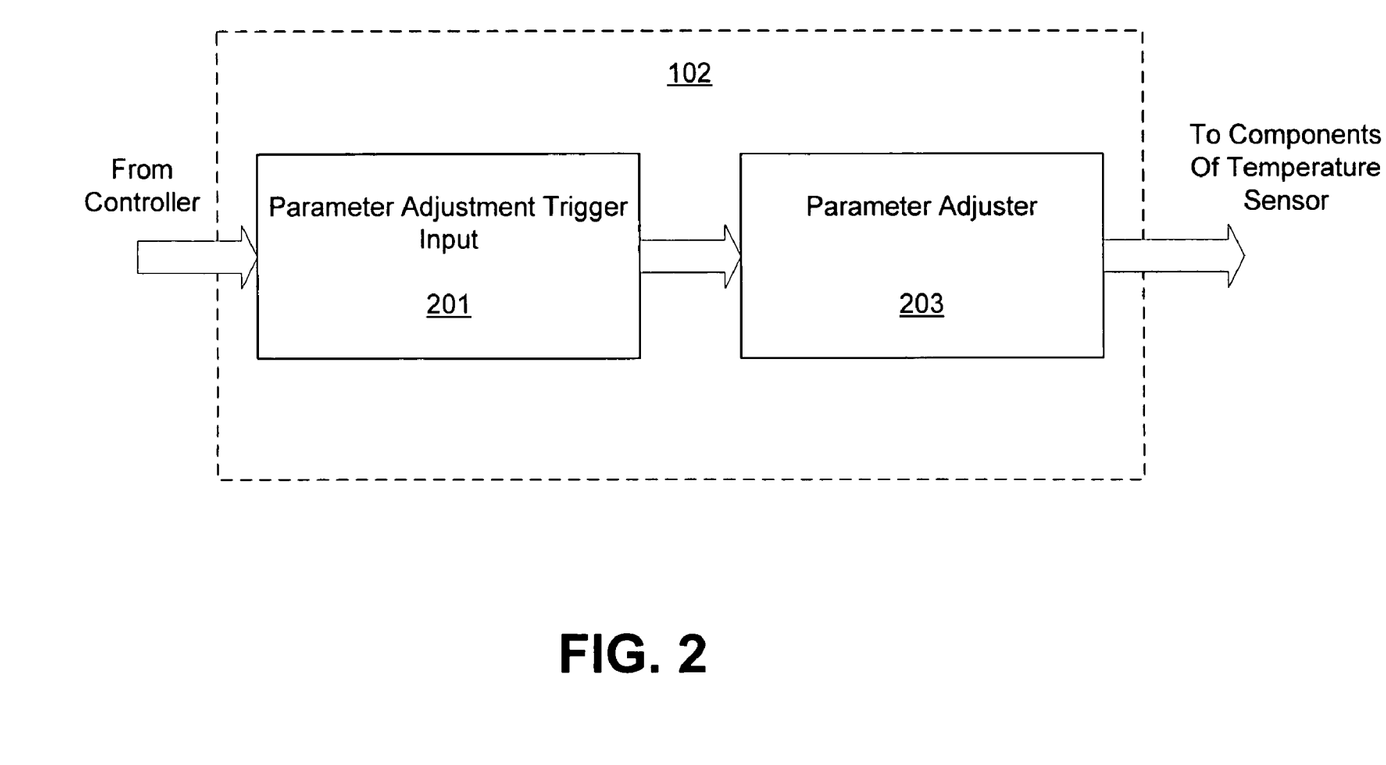
FIG. 2 is a block diagram of a system for adjusting parameters of a temperature sensor for settling time reduction according to one embodiment of the invention.

System for Temperature Sensor Settling Time Reduction According to One Embodiment of the Present Invention FIG. 2 is a block diagram of a system 102 for adjusting parameters of a temperature sensor for temperature sensor settling time reduction according to one embodiment of the invention. In one embodiment, one or more parameters of a temperature sensor (e.g., 101 in FIG. 1) can be adjusted to improve the settling time of the temperature sensor as is discussed above. It should be appreciated that the parameter adjustments can serve to hasten the settling action of the temperature sensor (e.g., 101 in FIG. 1), by maintaining a persistent settling pressure on components of the temperature sensor. In the FIG. 2 embodiment, system 102 includes parameter adjustment trigger input 201 and parameter adjuster 203.

Referring to FIG. 2, parameter adjustment trigger input 201 is configured to receive a parameter adjustment trigger. In one embodiment, the parameter adjustment trigger can be supplied by a controller (not shown). In another embodiment, the parameter adjustment trigger can be provided by another source.

Adjuster 203 adjusts one or more parameters associated with one or more components of the temperature sensor (e.g., 101 in FIG. 1). In one embodiment, adjuster 203 can be triggered to adjust one or more parameters associated with one or more components of the temperature sensor upon the initiation of a change in phase in a temperature measurement cycle. In one embodiment, an initiation of a change in phase can be controlled by a controller (not shown).

In one embodiment, through the adjustment of one or more parameters associated with one or more components of the temperature sensor (e.g., 101 in FIG. 1), the settling time of the temperature sensor (e.g., 101 in FIG. 1) can be reduced. In one embodiment, adjuster 203 can be implemented with one or more current sources or one or more adjustable resistances or a combination of both (see discussion below made with reference to FIG. 3).

In one embodiment, when a parameter adjustment is initiated, parameter adjuster 203 can counteract reaction by components of the temperature sensor that can serve to extend the settling time by adjusting one or more parameters associated with one or more components of the temperature sensor. In one embodiment, parameters that can be adjusted include but are not limited to: (1) op amp current sourcing/sinking capacity, (2) current in the feedback loop and (3) resistance in the feedback loop.

Figure 3A:
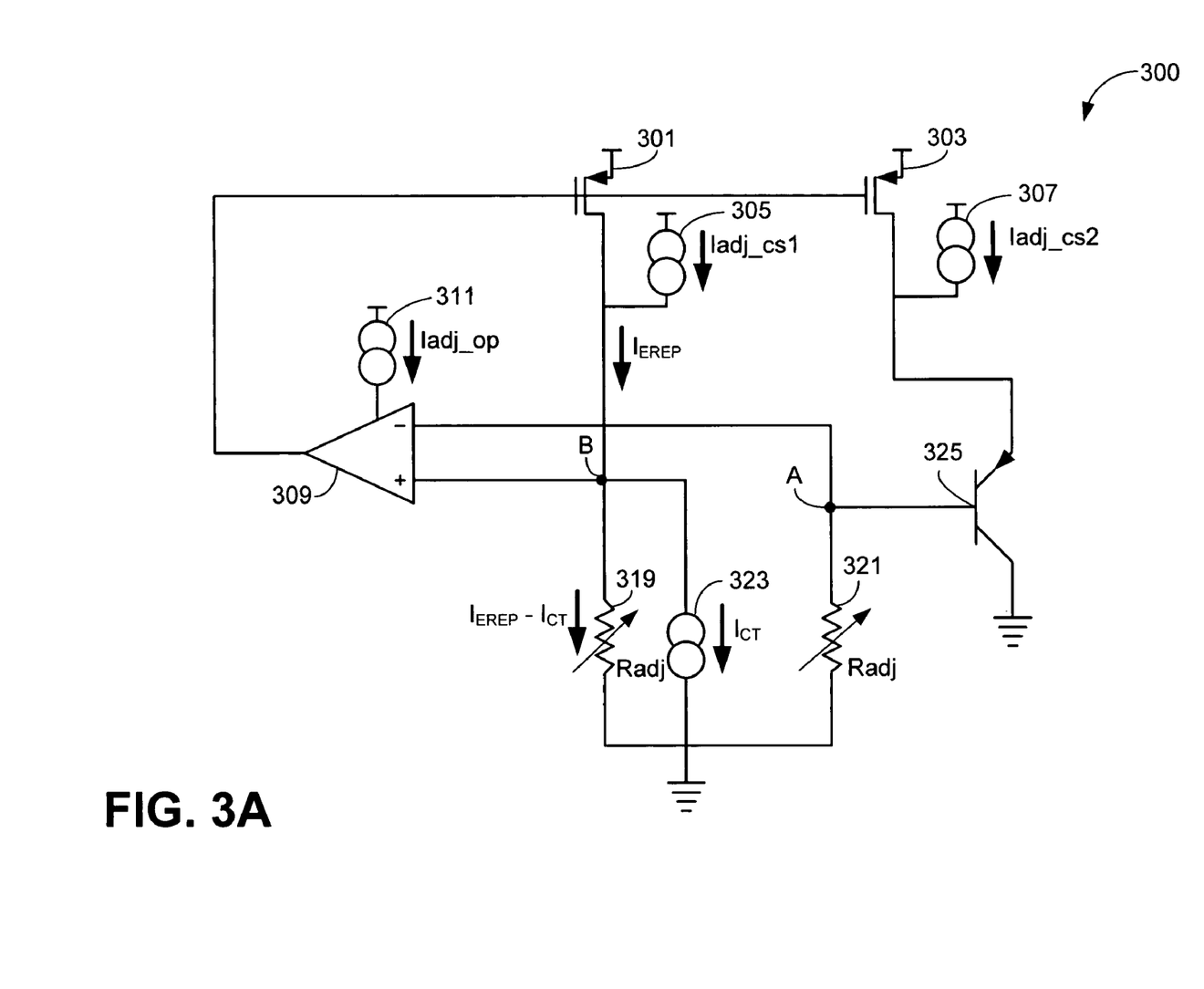
FIG. 3A shows a temperature sensor according to one embodiment of the present invention.

Temperature Sensor Circuit that Includes Components of System for Settling Time Reduction According to One Embodiment of the Present Invention FIG. 3A shows components of a temperature sensor circuit 300 that encompasses components of a system for adjusting parameters for settling time reduction according to one embodiment of the present invention. In one embodiment, temperature sensor circuit 300 can be stimulated by respective currents to provide respective readings (Vbe1 and Vbe2) that can be used to calculate temperature. The respective currents, (one of significantly higher amperage than the other) correspond to the respective phases of a temperature measurement cycle. As is shown in the FIG. 3A embodiment, temperature sensor circuit 300 includes p-mos transistors 301 and 303, current source current adjusters 305 and 307, op amp 1 309, op am current adjuster 311, adjustable resistors 319 and 321, target current source 323, and bipolar transistor 325.

Figures 3B, 3C:
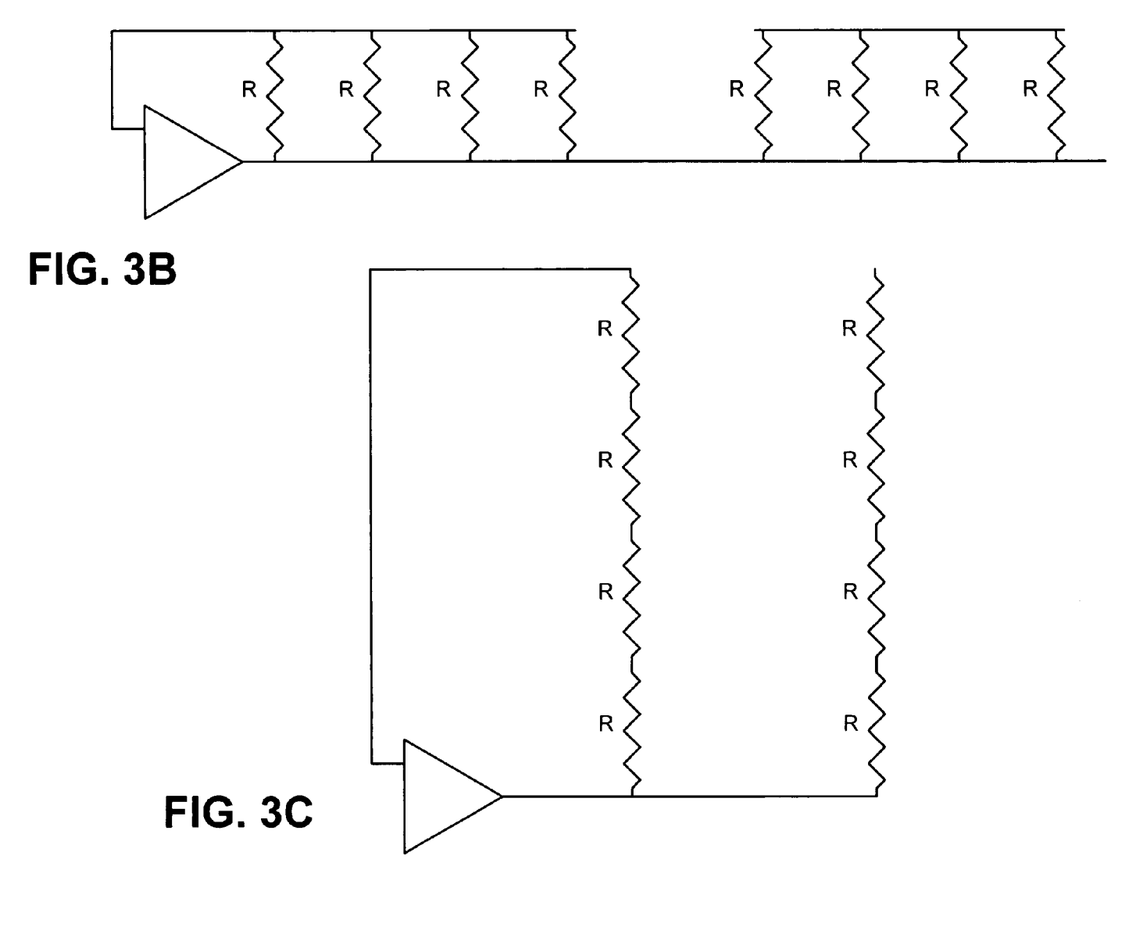
FIG. 3B shows a parallel matching scheme phase according to one embodiment of the present invention.
FIG. 3C shows a series matching scheme phase according to one embodiment of the present invention.

Referring to FIG. 3A, adjustable resistors 319 and 321 represent a plurality of resistors that can be coupled either in parallel or in series, as is shown in FIGS. 3B and 3C respectively, depending on the phase of a temperature measurement cycle. In one embodiment, the series coupling of the resistors can correspond to a higher resistance phase (and lower current phase) of a measurement cycle and the parallel coupling of the resisters can correspond to a lower resistance phase (and higher current phase) of a measurement cycle.

Figure 3D:
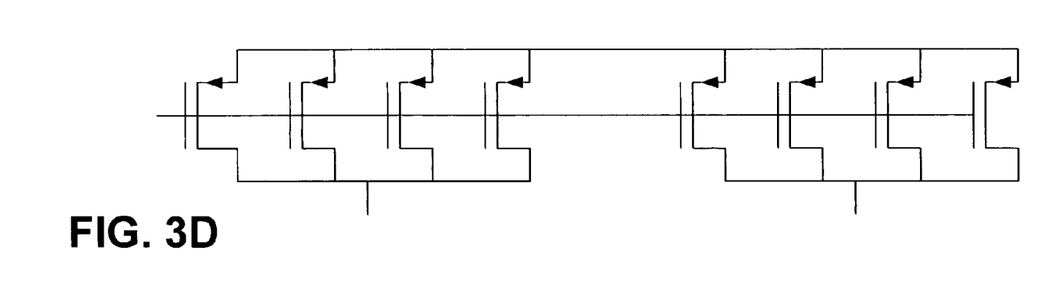
FIG. 3D shows a parallel transistor matching scheme phase according to one embodiment of the present invention.
Figure 3E:
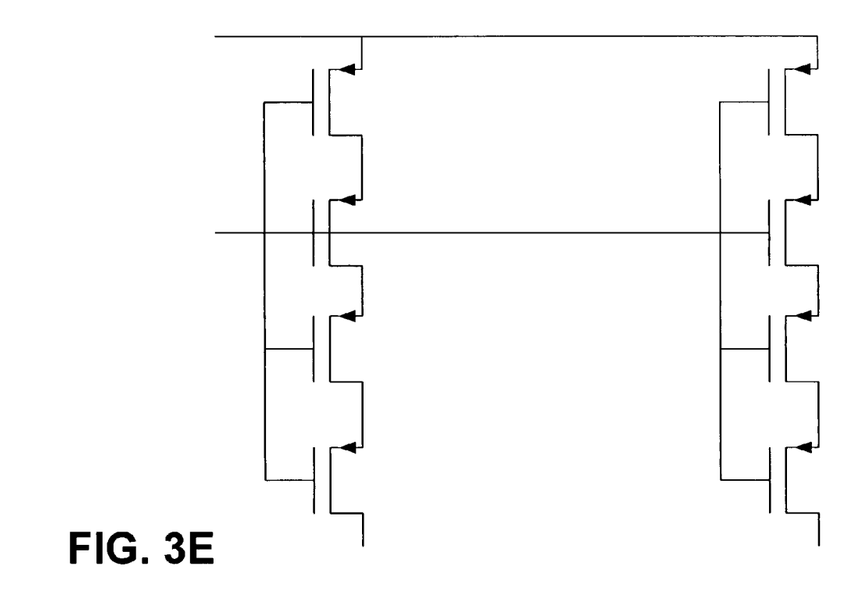
FIG. 3E shows a series transistor matching scheme phase according to one embodiment of the present invention.

Referring to FIG. 3A, p-mos transistors 301 and 303 represent a plurality of transistors that can be coupled either in parallel or in series, as is shown in FIGS. 3D and 3E respectively, depending on the phase of a temperature measurement cycle. In one embodiment, the series coupling of the transistors can correspond to a lower current phase of a measurement cycle and the parallel coupling of the transistors can correspond to a higher current phase of a measurement cycle.

In one embodiment a change in the base-emitter voltage, ΔVbe, of bipolar transistor 325 during a measurement cycle can be used to determine temperature. In one embodiment, a measurement of Vbe of bipolar transistor 325 at specified points corresponding to each of the aforementioned phases of a measurement cycle can provide values that can be used to determine ΔVbe using the following equation:

$$\Delta Vbe = Vbe1 - Vbe2$$

And, the change in the base-emitter voltage ΔVbe can be used to determine the temperature using the following equation:

$$T = \Delta Vbe / (Nk/q \ln[Ic1/Ic2])$$

Wherein Ic1 and Ic2 correspond to the current flowing in the collector of bipolar transistor 325 at specified points (after the settling of nodes of bipolar transistor 325) during a first and second phase of a measurement cycle. As a part of temperature sensor operation in a first phase, a value of signal $I_{CT}$ can be selected to establish the first collector current $I_{C T}$ and a first base-emitter voltage Vbe1 that can be used in the computation of T. Moreover, as a part of temperature sensor operation in a second phase, a value of signal $I_{CT}$ can be selected to establish a second collector current $I_{C2}$ and a second base-emitter voltage Vbe2 that can be used in the computation of T.

In switching from one phase of a measurement cycle to the next, nodes of bipolar transistor 325 such as base node A can lag behind other circuit nodes in reaching a steady or settled state wherein specified characteristics change negligibly. As discussed previously, the time required to reach this state after a change in phase is initiated can be referred to as settling time. It should be appreciated that the time required for base node A of bipolar transistor 325 associated with Radj1 321 to settle can be longer than the time required for node B associated with Radj 2 319 since the voltage drop across resistor Radj2 319 is dependent on $I_{CT}$ and thus follows the movements of $I_{CT}$ very closely with a negligible time lag. Because measurements cannot be taken until critical nodes of the bipolar transistor have settled, a settling time which is as short as is possible is highly desirable as was discussed above with reference to FIG. 1A.

Temperature Sensor Circuit Operation

In operation, in one phase of a temperature measurement cycle, the production of a target collector current $I_{CT}$ of a predetermined level can be used in association with a change from a high resistance matching scheme to a low resistance matching scheme. In such a phase, target current $I_{CT}$ can be adjusted higher by an amount sufficient to maintain the existing voltage level at node B as the resistance Radj2 319 is adjusted lower. As this occurs, the voltage at node A can fall lower than the voltage at node B since the rise in amperage of the current in resistance Radj1 321 lags behind the rise in amperage of the current in resistance Radj2 319 (see discussion above). The lower voltage at the inverting input terminal of op-amp1 309 causes op-amp1 309 to generate a higher voltage output. This higher voltage output more positively biases the gate-source voltage of p-mos transistors 301 and 303 and thus causes p-mos transistors 301 and 303 to decrease their current output. The decrease in current output of p-mos transistors 301 and 303 decreases the current in the emitter of bipolar transistor 325 during a period when an increase in this current level is being sought. In one embodiment, such a decrease in current in the emitter of bipolar transistor 325 can cause base node A to settle (e.g., reach a stable operating point at the higher current level) more slowly than if a higher current in the emitter were present driving the base voltage to settle more quickly at the higher voltage level. This can contribute to a longer settling time and thus can potentially delay the taking of measurements.

In accordance with one embodiment, the above discussed reaction of op amp1 to changes in target current $I_{CT}$ 309 that can operate to contribute to an increase in settling time can be counteracted through the use of current sources Iadj_op 311, Iadj_cs1 305 and Iadj_cs2 307, and adjustable resistances Radj1 319 and Radj2 321. In one embodiment, as means of counteracting the aforementioned reaction of op amp1 309 and to maintain a positive settling pressure on nodes of bipolar transistor 325: (1) current source 311 can be used to adjust Iadj_op 311 to compensate for the reduced current/voltage that is generated by op-amp1 309, (2) current source 305 can be used to adjust Iasj_cs voltage at the non-inverting input of op_amp1 309 in order to raise the voltage of the output of op_amp1 309 and (3) current source Iasj_cs2 307 can be used to adjust the current in the emitter of bipolar transistor 325. It should be appreciated that adjustable resistances Radj1 319 and Radj2 321 can be used to directly adjust the voltages at the inverting (e.g., A) and non inverting terminals (e.g., B) of op-amp1 309 respectively.

In a next phase of a temperature measurement cycle, a production of a target collector current $I_{CT}$ of a predetermined level can correspond to a change from a low resistance matching scheme to a high resistance matching scheme. In this phase, target current $I_{CT}$ can be adjusted lower by an amount sufficient to maintain the existing voltage level at node B as the resistance Radj2 319 is adjusted higher. As this occurs, the voltage at node A can rise higher than the voltage at node B since the fall in amperage of the current in resistance Radj1 321 can lag behind the fall in amperage of the current in resistance Radj2 319 (see discussion above). The higher voltage at the inverting input terminal of op-amp1 309 causes op-amp1 309 to generate a lower voltage output. This lower voltage output more negatively biases the gate-source voltage of p-mos transistors 301 and 303 and thus causes p-mos transistors 301 and 303 to increase their current output. The increase in current output of p-mos transistors 301 and 303 increases the current in the emitter of bipolar transistor 325 during a period when a decrease in this current level is being sought. In one embodiment, such an increase in current in the emitter of bipolar transistor 325 can cause base node A to settle (e.g., reach a stable operating point at the lower current level) more slowly than if a smaller current in the emitter were present driving the base voltage to settle more quickly at the lower voltage level. This can contribute to a longer settling time and thus can potentially delay the taking of measurements.

In accordance with one embodiment, the above discussed reaction of op amp1 to changes in target current $I_{CT}$ 309 that can operate to contribute to an increase settling time can be counteracted through the use of current sources Iadj_op 311, Iadj_cs1 305 and Iadj_cs2 307, and adjustable resistances Radj1 319 and Radj2 321. In one embodiment, as means of counteracting the aforementioned reaction of op amp1 309 and to maintain a positive settling pressure on nodes of bipolar transistor 325: (1) current source 311 can be used to adjust Iadj_op 311 to compensate for the increased current/voltage that is generated by op-amp1 309, (2) current source 305 can be used to adjust Iadj_cs1 voltage at the non-inverting input of op-amp1 309 in order to raise the voltage of the output of op-amp1 309 and (3) current source Iadj_cs2 307 can be used to directly adjust the current in the emitter of bipolar transistor 325. It should be appreciated that adjustable resistances Radj1 319 and Radj2 321 can be used to directly adjust the voltages at the inverting (e.g., A) and non inverting terminals (e.g., B) of op-amp1 309 respectively.

In one embodiment, the use of one or more of the current sources and adjustable resistances as a means of compensating for the aforementioned reaction of op amp1 309 and to maintain a positive settling pressure on nodes of bipolar transistor 325 can be triggered by a change in phase in the temperature measurement cycle. In another embodiment, a control circuit can be used to manage and to control the activation of one or more of the current sources and adjustable resistances based on measurements taken from temperature sensor.

It should be appreciated that in exemplary embodiments current/voltages can not only be increased but can be decreased as a means of providing appropriate settling pressure on nodes of the temperature sensor. For example, the current provided by Iadj_cs2 307 can be decreased to decrease the voltage at node A and thus increase the voltage of node B relative to that of node A.

Figure 3F:
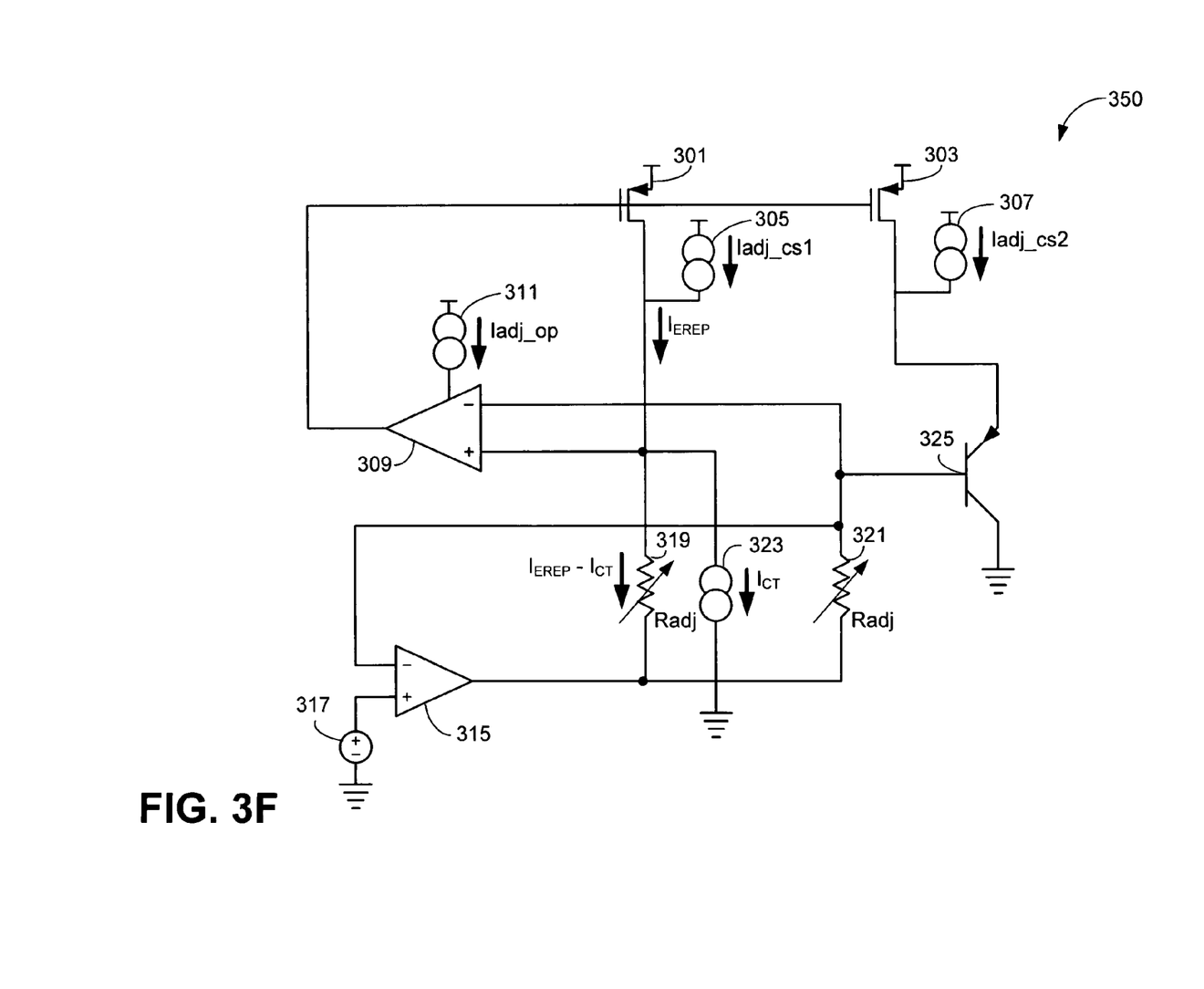
FIG. 3F shows a temperature sensor according to one embodiment of the present invention.

FIG. 3F shows components of a temperature sensor circuit 350 that encompasses components of a system (e.g., 102 in FIG. 2) for adjusting parameters for settling time reduction according to one embodiment of the present invention. In addition to the elements discussed above with reference to FIG. 3A, FIG. 3F includes op amp 2 315 and voltage source 317. Referring to FIG. 3E voltage source 317 provides a common mode reference and op amp 315 monitors deviations from this reference that are detected at the inverting input of op amp 315. It should be appreciated that deviations from this voltage are reflected in the output of op amp 2 315 which acts to counteract the deviations by adjusting the voltages provided at the junction of resistances Radj 319 and Radj 321.

Exemplary Operations According to Embodiments of the Present Invention

Figure 4:
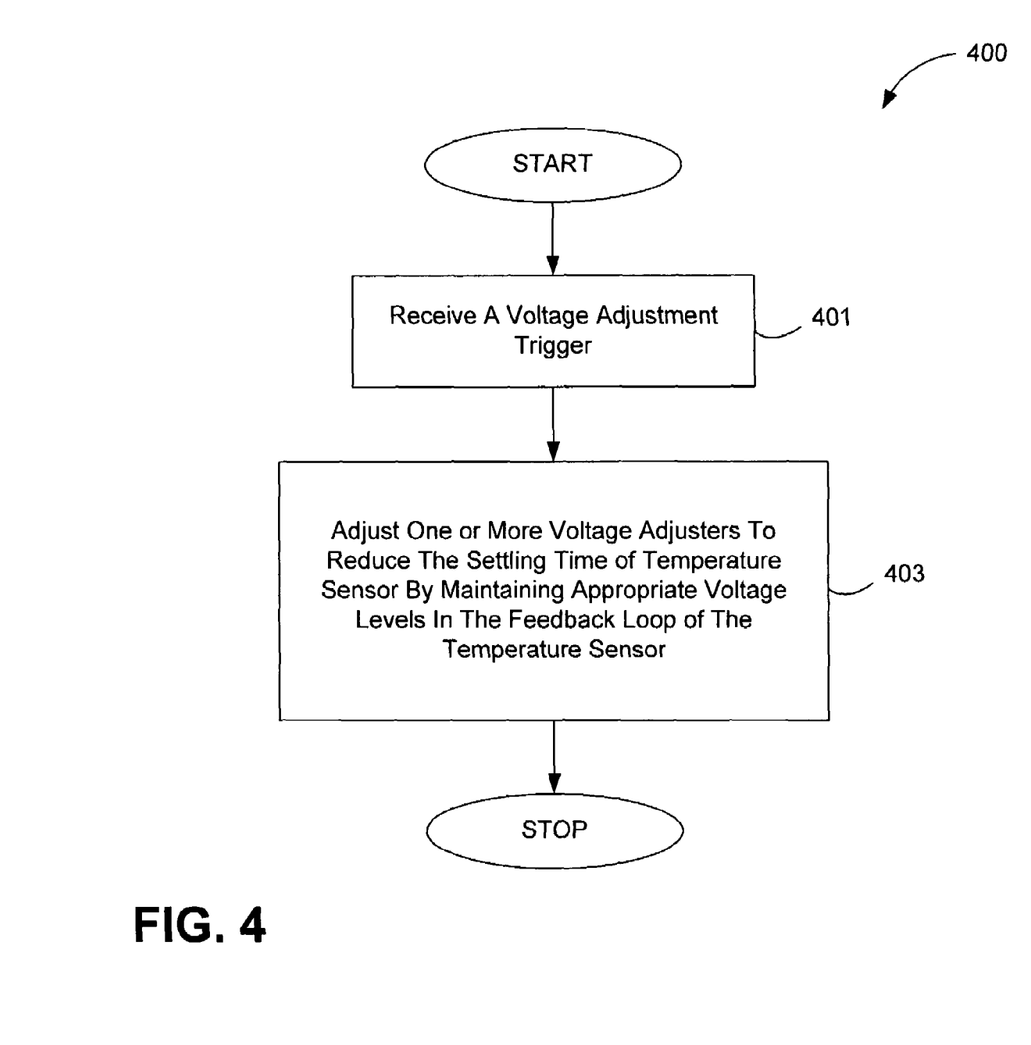
FIG. 4 shows a flowchart of the steps performed in a method for adjusting parameters of temperature sensor to shorten settling time according to embodiments of the present invention.

FIG. 4 shows a flowchart 400 of the steps performed in a method for adjusting parameters of a temperature sensor for settling time reduction according to one embodiment of the present invention. Although specific steps are disclosed in flowchart 400, such steps are merely exemplary. That is, the present invention is well suited to performing various other steps or variations of the steps shown in the flowcharts. Within various embodiments, it should be appreciated that certain steps of flowchart 400 may be performed by software, by hardware or by a combination of both.

Referring to FIG. 4, at step 401, a signal for triggering an adjustment of one or more parameters (e.g., voltages) associated with one or more portions of the temperature sensor is received. And, at step 403, one or more parameters (e.g., voltages) associated with one or more portions of the temperature sensor (e.g., 101 in FIG. 1) are adjusted in response to a receipt of the signal for triggering an adjustment. In one embodiment, the adjustment(s) maintain an appropriate voltage level at appropriate locations in the feedback loop of the temperature sensor to hasten settling time. In one embodiment, the one or more portions of the temperature sensor include but are not limited to an op amp, a feedback loop, one or more transistors and one or more resistors.

With reference to exemplary embodiments thereof, a system for adjusting parameters of a temperature sensor for settling time reduction is disclosed. The system includes an input for receiving a signal for triggering an adjustment of one or more voltages associated with one or more portions of the temperature sensor. And, an adjuster that includes a current sinking adjuster, a feedback loop current adjuster and a feedback loop resistance adjuster coupled to the input. The adjuster adjusts one or more voltages associated with one or more portions of the temperature sensor in response to a receipt of the signal for triggering an adjustment to achieve settling time reduction.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A system for adjusting parameters of a temperature sensor for settling time reduction, comprising:
   an input terminal coupled to said temperature sensor for receiving a signal for triggering an adjustment of one or more voltages associated with one or more portions of said temperature sensor; and
   an adjuster coupled to said input terminal comprising a current sourcing/and sinking adjuster, a temperature sensor feedback loop current adjuster coupled to said current sourcing and sinking adjuster and a temperature sensor feedback loop resistance adjuster coupled to said input terminal for adjusting voltages associated with said one or more portions of said temperature sensor in response to a receipt of said signal for triggering an adjustment to achieve said settling time reduction.

2. The system of claim 1 wherein said triggering said adjustment corresponds to a switch from a higher resistance matching scheme to a lower resistance matching scheme or vice versa.

3. The system of claim 1 wherein said triggering said adjustment corresponds to a switch from a higher current phase to a lower current phase or vice versa.

4. The system of claim 3 wherein measurements associated with said higher current phase and said lower current phase are taken to determine temperature.

5. The system of claim 1 wherein said one or more portions of said temperature sensor is selected from the group consisting of an op amp, a feedback loop, one or more transistors and one or more resistors.

6. The system of claim 5 wherein said current sinking adjuster adjusts the current sinking capacity of an op-amp, said feedback loop current adjuster adjusts the current in a feedback loop of said temperature sensor and said feedback loop resistance adjuster adjusts the resistance of said feedback loop of said temperature sensor.

7. In a temperature sensor for measuring temperature and providing an output measure of said temperature, a system for adjusting voltages of a temperature sensor to reduce the settling time of said temperature sensor, comprising:
   an input terminal coupled to said temperature sensor for receiving a signal for triggering an adjustment of one or more voltages associated with one or more portions of said temperature sensor; and
   an adjuster coupled to said input terminal comprising a current sourcing and sinking adjuster, a feedback loop current adjuster coupled to said current sourcing and sinking adjuster and a feedback loop resistance adjuster coupled to said input for adjusting said one or more voltages associated with said one or more portions of said temperature sensor in response to a receipt of said signal for triggering an adjustment, to achieve said settling time reduction.

8. The temperature sensor of claim 7 wherein said triggering said adjustment corresponds to a switch from a higher resistance matching scheme to a lower resistance matching scheme or vice versa.

9. The temperature sensor of claim 7 wherein said triggering said adjustment corresponds to a switch from a higher current phase to a lower current phase or vice versa.

10. The temperature sensor of claim 9 wherein measurements associated with said higher current phase and said lower current phase are taken to determine temperature.

11. The temperature sensor of claim 10 wherein said one or more portions of said temperature sensor is selected from the group consisting of an op amp, a feedback loop, one or more transistors and one or more resistors.

12. The temperature sensor of claim 11 wherein said current sinking adjuster adjusts the current sinking capacity of said op-amp, said feedback loop current adjuster adjusts the current in said feedback loop of said temperature sensor and said feedback loop resistance adjuster adjusts the resistance of said feedback loop of said temperature sensor.

13. A method for adjusting parameters of a temperature sensor to reduce the settling time of said temperature sensor, comprising:

receiving a signal for triggering an adjustment of one or more voltages associated with one or more portions of said temperature sensor; and adjusting voltages associated with said one or more portions of said temperature sensor in response to a receipt of said signal for triggering an adjustment to achieve said settling time reduction wherein said adjusting is performed by an adjuster comprising a current sourcing and sinking adjuster, a feedback loop current adjuster and a feedback loop resistance adjuster.

14. The method of claim 13 wherein said triggering said adjustment corresponds to a switch from a higher resistance matching scheme to a lower resistance matching scheme or vice versa.

15. The method of claim 13 wherein said triggering said adjustment corresponds to a switch from a higher current phase to a lower current phase or vice versa.

16. The method of claim 13 wherein measurements associated with said higher current phase and said lower current phase are taken to determine temperature.

17. The method of claim 13 wherein said one or more portions of said temperature sensor is selected from the group consisting of an op amp, a feedback loop, one or more transistors and one or more resistors.

18. The method of claim 17 wherein said adjusting is selected from the group consisting of adjusting the current sinking capacity of said op-amp, adjusting the current in said feedback loop of said temperature sensor; and adjusting the resistance of said feedback loop of said temperature sensor.

19. The method of claim 13 wherein said adjusting is performed by current sources and variable resistors.

20. The method of claim 13 wherein said adjustments are eliminated after a predetermined period.

* * * * *